US012385421B2

(12) United States Patent
Enami et al.

(10) Patent No.: US 12,385,421 B2
(45) Date of Patent: Aug. 12, 2025

(54) VALVE OPENING AND CLOSING TIMING CONTROL DEVICE

(71) Applicant: AISIN CORPORATION, Aichi (JP)

(72) Inventors: Takuya Enami, Kariya (JP); Seiichi Fujimoto, Kariya (JP); Masaaki Kaneko, Kariya (JP)

(73) Assignee: AISIN CORPORATION, Aichi (JP)

( * ) Notice: Subject to any disclaimer, the term of this patent is extended or adjusted under 35 U.S.C. 154(b) by 4 days.

(21) Appl. No.: 18/586,837

(22) Filed: Feb. 26, 2024

(65) Prior Publication Data

US 2024/0295181 A1 Sep. 5, 2024

(30) Foreign Application Priority Data

Mar. 1, 2023 (JP) ................................ 2023-031255

(51) Int. Cl.

*F01L 1/344* (2006.01)
*F01L 13/00* (2006.01)
*F02D 13/02* (2006.01)
*F02D 41/04* (2006.01)

(52) U.S. Cl.

CPC ............... *F01L 1/344* (2013.01); *F01L 13/00* (2013.01); *F02D 13/0219* (2013.01); *F02D 41/042* (2013.01)

(58) Field of Classification Search

CPC ....... F01L 13/00; F01L 1/344; F02D 13/0219; F02D 41/042

See application file for complete search history.

(56) References Cited

U.S. PATENT DOCUMENTS

2022/0325642 A1* 10/2022 Sugiyama .......... F01L 1/34409

FOREIGN PATENT DOCUMENTS

JP 2016-205195 A 12/2016

* cited by examiner

*Primary Examiner* — Ngoc T Nguyen
(74) *Attorney, Agent, or Firm* — Sughrue Mion, PLLC

(57) ABSTRACT

A valve open/close timing controller including a driving-side rotating body rotating about a rotating shaft core synchronously with a crankshaft of an internal combustion engine with a driven-side rotating body inside the driving-side rotating body and coaxially with the rotating shaft core that rotates integrally with a camshaft to open/close an intake valve of an internal combustion engine. A phase adjusting mechanism sets a relative rotation phase between the driving-side and driven-side and a phase controller performs a retard operation to shift the relative rotation phase to a most retarded phase by displacing the driven-side rotating body in a direction opposite to the driving-side rotating body, and, when rotational speed of the engine reaches a lower limit rotational speed during stopping of the engine, advances the relative rotation phase as the most retarded phase by displacing the driven-side rotating body in a same direction as the driving-side rotating body.

8 Claims, 5 Drawing Sheets

VALVE OPENING AND CLOSING TIMING CONTROL DEVICE

CROSS REFERENCE TO RELATED APPLICATIONS

This application is based on and claims priority under 35 U.S.C. § 119 to Japanese Patent Application No. 2023-031255, filed on Mar. 1, 2023, the entire content of which is incorporated herein by reference.

TECHNICAL FIELD

The present disclosure relates to a valve opening and closing range control device.

BACKGROUND DISCUSSION

Conventionally, there is known a valve opening and closing timing control device configured to control a valve opening and closing timing by cam portions of a camshaft based on torque transmitted from a crankshaft of an internal combustion engine. A vehicle including such a valve opening and closing timing control device is, for example, disclosed in Japanese Patent Application Publication No. 2016-205195 below.

A hybrid vehicle is disclosed in Japanese Patent Application Publication No. 2016-205195. In the hybrid vehicle, while the engine is being stopped, the valve opening and closing timing control device is configured to shift a valve opening timing of an intake valve to a retard side. While shifting the valve opening timing of the intake valve to the retard side, and upon receipt of a request to restart the engine before the engine stops, the valve opening and closing timing control device is configured to shift the valve opening timing of the intake valve to an advance side.

In the hybrid vehicle disclosed in Japanese Patent Application Publication No. 2016-205195, when a supply of fuel to the engine is stopped, the valve opening timing of the intake valve is shifted to the retard side. With this configuration, a supply of fresh air, which may deteriorate a catalyst (catalyst for purifying an exhaust gas) in an exhaust flow path, is less prone to occur. Additionally, while the engine is being stopped, the catalyst is not brought into a lean state (oxygen-rich state), so that an excessive supply of the fuel is less prone to occur at next start of the engine. However, upon receipt of the request to restart the engine when the valve opening timing of the intake valve is in the retard phase, the valve opening timing needs to be advanced to a phase in which the engine can be ignited. Accordingly, with the hybrid vehicle disclosed in Japanese Patent Application Publication No. 2016-205195, a delay (response delay) may occur in response to the request to restart the engine and thus, drivability may deteriorate.

A need thus exists for a valve opening and closing timing control device which is not susceptible to the drawback mentioned above.

SUMMARY

A valve opening and closing timing control device includes: a driving-side rotating body configured to rotate about a rotating shaft core synchronously with a crankshaft of an internal combustion engine; a driven-side rotating body located inside the driving-side rotating body and coaxially with the rotating shaft core, and configured to rotate integrally with a camshaft for opening and closing an intake valve of the internal combustion engine; a phase adjusting mechanism configured to set a relative rotation phase between the driving-side rotating body and the driven-side rotating body by a driving force of an electric motor; and a phase controller configured, upon receipt of a command to stop the internal combustion engine, to perform retard operation control to shift the relative rotation phase to a most retarded phase by displacing the driven-side rotating body in a direction opposite to a rotating direction of the driving-side rotating body, and configured, when rotational speed of the internal combustion engine reaches a lower limit rotational speed predetermined during stopping of the internal combustion engine, to perform advance operation control to advance the relative rotation phase as the most retarded phase by displacing the driven-side rotating body in a direction same as the rotating direction of the driving-side rotating body.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

An embodiment of this disclosure will be described with reference to the attended drawings.

[Basic Configuration]

Figure 1:
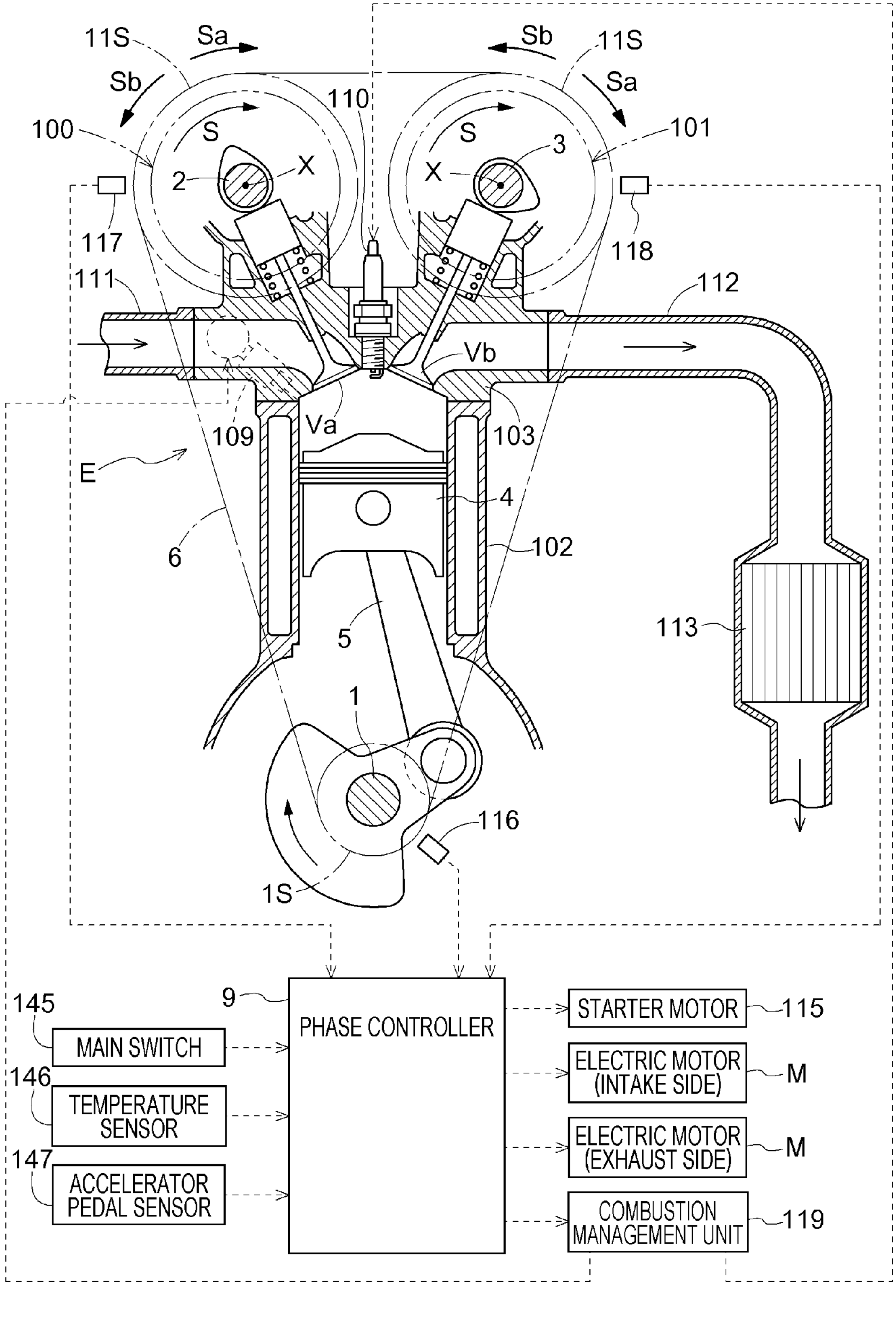
FIG. 1 is a cross-sectional view of an internal combustion engine including a valve opening and closing timing control device.
Figure 2:
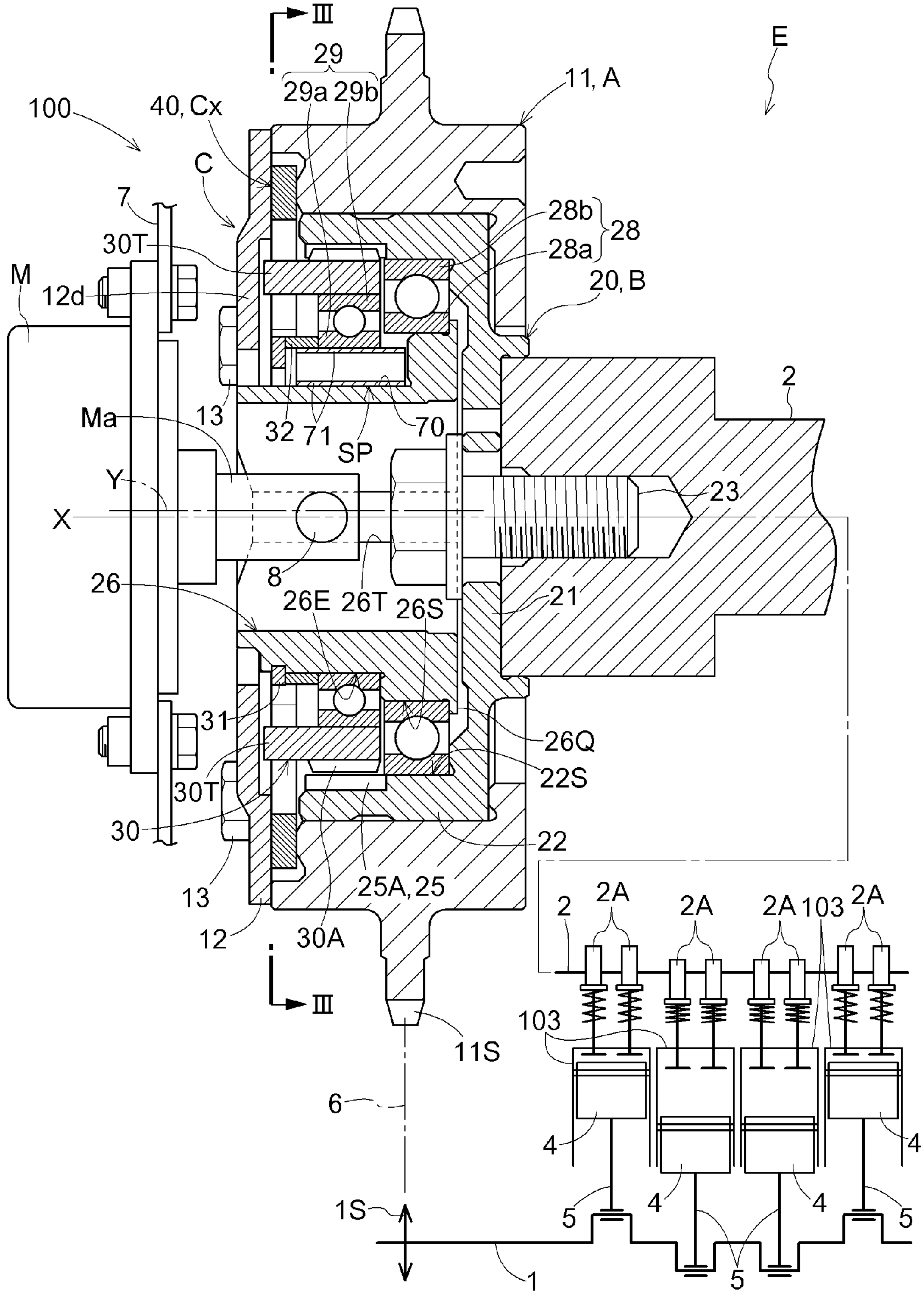
FIG. 2 is a cross-sectional view of the valve opening and closing timing control device.
Figure 3:
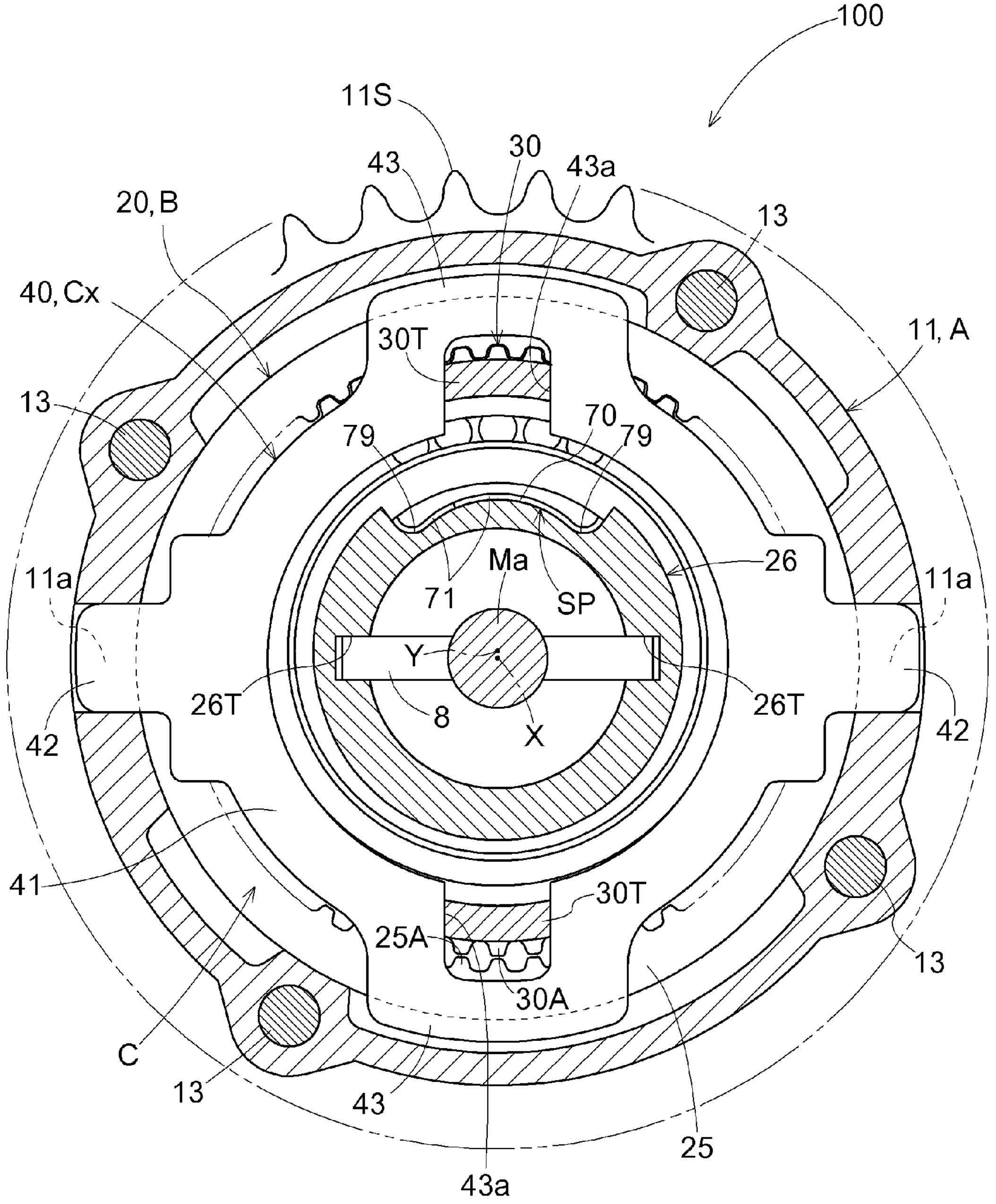
FIG. 3 is a cross-sectional view taken along line III-III of FIG. 2.

Hereinafter, a valve opening and closing timing control device 100 of this embodiment will be described. FIG. 1 is a cross-sectional view of an internal combustion engine (hereinafter, referred to as an "engine E") including the valve opening and closing timing control device 100. FIG. 2 is a cross-sectional view of the valve opening and closing timing control device 100. FIG. 3 is a cross-sectional view taken along line III-III of FIG. 2.

As illustrated in FIG. 1, the engine E includes an intake valve Va and an exhaust valve Vb. The valve opening and closing timing control device 100 sets a valve timing (valve opening and closing timing) of the intake valve Va. In this embodiment, a valve opening and closing timing control device 101 is also provided to set a valve timing of the exhaust valve Vb. The valve opening and closing timing control device 100, the valve opening and closing timing control device 101, and driving of the engine E are controlled by a phase controller 9. The valve opening and closing timing control device 101 for setting the valve timing of the exhaust valve Vb may be omitted.

The engine E is arranged in a vehicle and outputs travel driving force of the vehicle. The phase controller 9 is designed, when an operation of the engine E is temporarily stopped during travel of the vehicle, to reduce degradation in fuel consumption as well as increase drivability at restart of the engine E (as will be described in detail later).

[Engine]

As illustrated in FIGS. 1 and 2, in the engine E, a cylinder head 103 is connected to an upper portion of a cylinder block 102 that rotatably supports a crankshaft 1, and a piston 4 is reciprocatably housed in a plurality of cylinder bores in the cylinder block 102. In this embodiment, the piston 4 is connected to the crankshaft 1 through a connecting rod 5, and is designed as a four-cycle piston.

As described above, the intake valve Va and the exhaust valve Vb are arranged in the cylinder head 103. An intake camshaft 2 for opening and closing the intake valve Va and an exhaust camshaft 3 for opening and closing the exhaust valve Vb are provided above the cylinder head 103.

The cylinder head 103 includes an injector 109 for injecting fuel into a combustion chamber and an ignition plug 110. An intake manifold 111 for supplying air to the combustion chamber through the intake valve Va and an exhaust manifold 112 for expelling combustion gas out of the combustion chamber through the exhaust valve Vb are connected to the cylinder head 103. The exhaust manifold 112 includes a catalyst 113 for purifying exhaust gas flowing through the exhaust manifold 112. The catalyst 113 corresponds to a typically called three-way catalyst for oxidation reaction of CO or HC and reduction reaction of NOx. The engine E includes a starter motor 115 for driving and rotating the crankshaft 1 at start of the engine E.

As illustrated in FIG. 2, the valve opening and closing timing control device 100 includes a driving-side rotating body A, a driven-side rotating body B, and a phase adjusting mechanism C. The driving-side rotating body A rotates about a rotating shaft core X synchronously with the crankshaft 1 of the engine E as the internal combustion engine. The driven-side rotating body B is located inside the driving-side rotating body A and coaxially with the rotating shaft core X. The driven-side rotating body B rotates integrally with the intake camshaft 2 (as an example of a "camshaft") for opening and closing the intake valve Va of the engine E. The phase adjusting mechanism C sets a relative rotation phase between the driving-side rotating body A and the driven-side rotating body B by a driving force of an electric motor M.

A timing chain 6 (a timing belt or the like may be used instead) is wound about an output sprocket 1S of the crankshaft 1 of the engine E and a driving sprocket 11S of the driving-side rotating body A.

During the operation of the engine E, the entire valve opening and closing timing control device 100 rotates about the rotating shaft core X in a driving rotational direction S by the driving force from the timing chain 6. Additionally, the driving force of the electric motor M activates the phase adjusting mechanism C, causing the driven-side rotating body B to be displaceable in the same direction as or in the opposite direction to a rotating direction of the driving-side rotating body A. When the driven-side rotating body B is displaced as described above, the same direction as the driving rotational direction S is referred to as an advance direction Sa, and the opposite direction to the driving rotational direction S is referred to as a retard direction Sb. The phase adjusting mechanism C sets the relative rotation phase between the driving-side rotating body A and the driven-side rotating body B by these displacements, thereby resulting in control of the valve opening and closing timing of the intake valve Va performed by cam portions 2A of the intake camshaft 2.

Here, an operation to displace the driven-side rotating body B relatively in the same direction as the rotating direction of the driving-side rotating body A is referred to as an advance operation, which increases an intake compression ratio. On the other hand, an operation to displace the driven-side rotating body B relatively in the opposite direction to the rotating direction of the driving-side rotating body A (in the opposite direction to the direction selected in the advance operation) is referred to as a retard operation, which reduces the intake compression ratio.

[Valve Opening and Closing Timing Control Device]

As illustrated in FIG. 2, the driving-side rotating body A includes an outer case 11, and a front plate 12 fastened to the outer case 11 with a plurality of fastening bolts 13. The outer case 11 has a driving sprocket 11S formed on its outer circumference. The outer case 11, having a bottomed tubular shape, has an opening at its bottom. The front plate 12 is located opposite to the intake camshaft 2 with respect to an eccentric member 26 in a direction along the rotating shaft core X.

As illustrated in FIGS. 2 and 3, an intermediate member 20 as the driven-side rotating body B and the phase adjusting mechanism C having a hypocycloid gear mechanism are housed in an inner space of the outer case 11. The phase adjusting mechanism C also includes an Oldham coupling Cx that reflects the phase shifting on the driving-side rotating body A and the driven-side rotating body B.

In the intermediate member 20 as the driven-side rotating body B, a support wall 21 and a tubular wall 22 are integrally formed. The support wall 21 is connected to the intake camshaft 2 in an orientation orthogonal to the rotating shaft core X, and the tubular wall 22 has a tubular shape about the rotating shaft core X and protrudes from an outer peripheral edge of the support wall 21 in a direction away from the intake camshaft 2.

The intermediate member 20 is relatively rotatably fitted, with an outer surface of the tubular wall 22 being in contact with an inner surface of the outer case 11, and then fixed to an end of the intake camshaft 2 with a connecting bolt 23 inserted through a through hole at a center of the support wall 21. In this fixed state, an outer end of the tubular wall 22 (an end farther from the intake camshaft 2) is located inward of the front plate 12.

As illustrated in FIG. 2, the electric motor M is supported to the engine E by a support frame 7 such that an output shaft Ma of the electric motor M is arranged coaxially with the rotating shaft core X. On the output shaft Ma of the electric motor M, a pair of engaging pins 8 are formed orthogonally to the rotating shaft core X.

[Phase Adjusting Mechanism]

As illustrated in FIGS. 2 and 3, the phase adjusting mechanism C includes the intermediate member 20, an output gear 25 on an inner circumferential surface of the tubular wall 22 of the intermediate member 20, the eccentric member 26, an elastic member SP, a first bearing 28, a second bearing 29, an input gear 30, a fixing ring 31, a spacer 32 having a ring shape, and the Oldham coupling Cx. In this embodiment, the first bearing 28 corresponds to a ball bearing having an inner ring 28*a* in contact with an outer circumferential surface of the eccentric member 26 and an outer ring 28*b* in contact with an inner peripheral surface of the intermediate member 20. The second bearing 29 corresponds to a ball bearing having an inner ring 29*a* in contact with the outer circumferential surface of the eccentric member 26 and an outer ring 29*b* in contact with an inner peripheral surface of the input gear 30.

As illustrated in FIG. 2, at a position inward of the inner circumference of the tubular wall 22 (position adjacent to the support wall 21) of the intermediate member 20, a support surface 22S is formed about the rotating shaft core X in a direction extending along the rotating shaft core X (hereinafter, referred to as "axially"), and the output gear 25 is formed about the rotating shaft core X at a position outward of the support surface 22S (at a side farther from intake camshaft 2).

The eccentric member 26 has a tubular shape. On the outer circumferential surface of the eccentric member 26, a circumferential support surface 26S is formed axially inward of the rotating shaft core X (formed at a side closer to the intake camshaft 2). At a position axially more inward of the circumferential support surface 26S (at a position further closer to the intake camshaft 2), a flange 26Q protrudes radially outward from the circumferential support surface 26S. Additionally, on the outer circumferential surface of the eccentric member 26 (at the side farther from the intake camshaft 2), an eccentric support surface 26E is formed about an eccentric shaft core Y extending eccentrically parallel to the rotating shaft core X. Thus, on the eccentric member 26, the flange 26Q, the circumferential support surface 26S, and the eccentric support surface 26E are axially arranged in this sequential order from the side closer to the intake camshaft 2. A direction extending along the eccentric shaft core Y is identical to the direction that has been referred to as "axially", and is thus hereinafter referred to simply as "axially".

As illustrated in FIGS. 2 and 3, the eccentric support surface 26E has a first recess 70 recessed radially inward of the eccentric member 26. On a bottom surface of the first recess 70 and at both circumferential ends of the eccentric member 26, a pair of second recesses 79, 79 are recessed radially and axially with respect to the eccentric member 26. In this embodiment, the first recess 70 has a circumferentially symmetric shape.

Each of the pair of second recesses 79, 79 is formed at the corresponding circumferential end of the eccentric member 26 in the first recess 70. Each of the pair of second recesses 79, 79 has a bottom surface formed radially of the eccentric member 26, and the bottom surface has a maximum depth that is greater than a depth of the bottom surface of the first recess 70 near a circumferential center of the eccentric member 26. In each of the pair of second recesses 79, 79 formed circumferentially of the eccentric member 26, a surface from the corresponding bottom surface to the corresponding end has a shape along a curved shape of a spring member 71 as will be described later.

An elastic member SP is fitted into the first recess 70. The elastic member SP includes the pair of spring members 71, 71. In this embodiment, the pair of spring members 71, 71 are identical in shape and size. The elastic member SP applies an energizing force to the input gear 30 through the second bearing 29 such that a part of external teeth 30A of the input gear 30 engage with a part of internal teeth 25A of the output gear 25.

On the inner circumference of the eccentric member 26, a pair of engaging grooves 26T, to which the pair of engaging pins 8 of the electric motor M are respectively engageable, are formed parallel to the rotating shaft core X.

When the first bearing 28 has been fitted to an outer circumference of the circumferential support surface 26S, and then the first bearing 28 has been fitted to the support surface 22S of the tubular wall 22, the eccentric member 26 is rotatably supported about the rotating shaft core X with respect to the intermediate member 20. The input gear 30 is supported to the eccentric support surface 26E of the eccentric member 26 through the second bearing 29 so as to be rotatable about the eccentric shaft core Y.

In the phase adjusting mechanism C, the external teeth 30A of the input gear 30 have one tooth less than the internal teeth 25A of the output gear 25. In this state, a part of the external teeth 30A of the input gear 30 engage with a part of the internal teeth 25A of the output gear 25.

As illustrated in FIG. 2, the fixing ring 31 is supported by the outer circumference of the eccentric member 26 in a fitted state so that, with the spacer 32 interposed between the fixing ring 31 and the second bearing 29, the fixing ring 32 prevents the second bearing 29 from coming off.

[Phase Adjusting Mechanism: Oldham Coupling]

As illustrated in FIG. 3, the Oldham coupling Cx corresponds to a coupling member 40 having a plate shape, and in the coupling member 40, an annular portion 41, a pair of external engaging arms 42, and a pair of internal engaging arms 43 are integrally formed. The annular portion is located at a center of the coupling member 40, the pair of external engaging arms 42 protrude radially outward from the annular portion 41 in a first direction (left to right in FIG. 3), and the pair of internal engaging arms 43 protrude radially outward from the annular portion 41 in a second direction (top to bottom in FIG. 3) orthogonal to the first direction.

Each of the pair of internal engaging arms 43 has an engaging recess 43*a* continuous with an opening of the annular portion 41.

As illustrated in FIGS. 2 and 3, the outer case 11 has a pair of guide grooves 11*a* at its opening edges that the front plate 12 abuts. Each of the pair of guide grooves 11*a* is designed as a through groove extending radially about the rotating shaft core X from the inner space to an outer space of the outer case 11. Each of the guide grooves 11*a* has a groove width designed slightly greater than a width of the corresponding external engaging arm 42.

The input gear 30 has an end face opposing the front plate 12, and a pair of engaging projections 30T are integrally formed on the end faces. Each of the engaging projections 30T has an engaging width designed slightly smaller than an engaging width of the corresponding engaging recess 43*a* of the pair of internal engaging arms 43.

With this configuration, the pair of external engaging arms 42 of the coupling member 40 respectively engage with the pair of guide grooves 11*a* of the outer case 11, and the pair of engaging projections 30T of the input gear 30 respectively engage with the pair of engaging recesses 43*a* of the pair of internal engaging arm 43 of the coupling member 40, thereby causing the Oldham coupling Cx to function.

The coupling member 40 is displaceable in the first direction (left to right in FIG. 3) in which the pair of external engaging arms 42 extend with respect to the outer case 11, and the input gear 30 is displaceable in the second direction (top to bottom in FIG. 3) along which the pair of engaging recesses 43*a* of the pair of internal engaging arms 43 are formed with respect to the coupling member 40.

With the spacer 32 interposed between the Oldham coupling Cx (coupling member 40) and the second bearing 29, the second bearing 29 moves axially only within a distance equal to or smaller than a predetermined set value.

On a surface of the front plate 12 opposing the input gear 30, a recess 12*d* is recessed outward (to the side farther from the intake camshaft 2). The recess 12*d* opposes an opening of the coupling member 40 of the front plate 12, and is formed slightly greater in circumferential length and axial length than the opening of the coupling member 40. Thus, the engaging projection 30T of the input gear 30 is prevented from coming into contact with the front plate 12.

[Valve Opening and Closing Timing Control Device-Location of Each Component]

As illustrated in FIG. 2, in the valve opening and closing timing control device 100, the support wall 21 of the intermediate member 20 is connected to the end of the intake camshaft 2 with the connecting bolt 23, and these components rotate integrally. The eccentric member 26 is supported to the intermediate member 20 by the first bearing 28 so as to be relatively rotatable about the rotating shaft core X. As illustrated in FIG. 2, the input gear 30 is supported to the eccentric support surface 26E of the eccentric member 26 by the second bearing 29, so that a part of the external teeth 30A of the input gear 30 engage with a part of the internal teeth 25A of the output gear 25.

Further, as illustrated in FIG. 3, each of the pair of external engaging arms 42 of the Oldham coupling Cx engages with the corresponding guide groove 11*a* of the outer case 11, and each of the pair of engaging projections 30T of the input gear 30 engages with the corresponding engaging recess 43*a* of the pair of internal engaging arms 43 of the Oldham coupling Cx. As illustrated in FIG. 2, the front plate 12 is located outward of the coupling member 40 of the Oldham coupling Cx, so that the coupling member 40 is movable orthogonally to the rotating shaft core X while being in contact with an inner surface of the front plate 12. With this configuration, the Oldham coupling Cx is located outward of the first bearing 28 and the second bearing 29 (at the side farther from the intake camshaft 2) and inward of the front plate 12 (at the side closer to the intake camshaft 2).

As illustrated in FIG. 2, each of the pair of engaging pins 8 formed on the output shaft Ma of the electric motor M engages with the corresponding engaging groove 26T of the eccentric member 26.

[Mode of Operation of Phase Adjusting Mechanism]

As illustrated in FIGS. 1 and 2, in a vicinity of the crankshaft 1, a crank angle sensor 116 is provided to detect a rotational angle of the crankshaft 1. In a vicinity of the intake camshaft 2, an intake-side cam angle sensor 117 is provided to detect a rotational angle of the intake camshaft 2; and in a vicinity of the exhaust camshaft 3, an exhaust-side cam angle sensor 118 is provided to detect a rotational angle of the exhaust camshaft 3.

Each of the crank angle sensor 116, the intake-side cam angle sensor 117, and the exhaust-side cam angle sensor 118 is designed to intermittently output a pulse signal as the corresponding shaft rotates. When the crankshaft 1 rotates, the crank angle sensor 116 counts the pulse signals from a rotation reference of the crankshaft 1 to acquire the rotational angle from the rotation reference. Similarly, when the intake camshaft 2 rotates, each of the intake-side cam angle sensor 117 and the exhaust-side cam angle sensor 118 counts the pulse signals from a rotation reference of the intake camshaft 2 such that the phase controller 9 acquires the rotational angle from the rotation reference.

Here, for example, with the outer case 11 and the intermediate member 20 being in predetermined reference phases (e.g., intermediate phases), the counts from the crank angle sensor 116 and the counts from the intake-side cam angle sensor 117 or the exhaust-side cam angle sensor 118 are stored. As a result, even when the relative rotation phase is displaced from the reference phase to any one of the advance side (in the advance direction Sa) and the retard side (in the retard direction Sb), it is possible to acquire the relative rotation phase based on comparison between the counts from the two sensors.

The phase controller 9 receives inputs of detection signals from the crank angle sensor 116, the intake-side cam angle sensor 117, and the exhaust-side cam angle sensor 118, together with inputs of detection signals from a main switch 145, a temperature sensor 146, and an accelerator pedal sensor 147. The phase controller 9 outputs a control signal to the starter motor 115, the electric motor M, and a combustion management unit 119.

In this control configuration, the main switch 145 is located on a panel of a driver's seat of the vehicle, and allows the start and complete stop of the engine E by manual operation. The accelerator pedal sensor 147 acquires a stepping amount of an accelerator pedal (not illustrated). The combustion management unit 119 manages operations of pumps for supplying fuel to the injector 109, and manages an ignition order and timing by controlling an ignition circuit for supplying power to the ignition plug 110.

The electric motor M is under control of the phase controller 9. As described above, the engine E includes the crank angle sensor 116, the intake-side cam angle sensor 117, and the exhaust-side cam angle sensor 118 for detecting rotational speed (number of revolutions per unit time) of the crankshaft 1 or the intake camshaft 2, and the detection signals from these sensors are input to the valve opening and closing timing control device.

The phase controller 9 maintains the relative rotation phase by driving the electric motor M at a speed equal to the rotational speed of the intake camshaft 2 during the operation of the engine E. When the rotational speed of the electric motor M is lower than the rotational speed of the intake camshaft 2, the phase controller 9 performs the advance operation. On the other hand, when the rotational speed of the electric motor M is higher, the phase controller 9 performs the retard operation. The advance operation increases the intake compression ratio, while the retard operation reduces the intake compression ratio.

When the electric motor M rotates at a speed equal to rotational speed of the outer case 11 (the speed equal to the rotational speed of the intake camshaft 2), an engaging position of the external teeth 30A of the input gear 30 with the internal teeth 25A of the output gear 25 does not change. Thus, the relative rotation phase of the driven-side rotating body B to the driving-side rotating body A is maintained.

On the other hand, when the output shaft Ma of the electric motor M is driven and rotated at a speed higher or lower than the rotational speed of the outer case 11, the eccentric shaft core Y of the phase adjusting mechanism C revolves about the rotating shaft core X. Due to this revolution, the engaging position of the external teeth 30A of the input gear 30 with the internal teeth 25A of the output gear 25 is displaced along an inner periphery of the output gear 25, and a rotational force acts between the input gear 30 and the output gear 25. In other words, a rotational force about the rotating shaft core X acts on the output gear 25, and a rotational force for rotating about the eccentric shaft core Y acts on the input gear 30.

Each of the pair of engaging projections 30T of the input gear 30 engages with the corresponding engaging recess 43*a* of the pair of internal engaging arms 43 of the coupling member 40. In this state, the input gear 30 does not rotate with respect to the outer case 11, and the rotational force thus acts on the output gear 25. Due to the rotational force acted on the output gear 25, the intermediate member 20 along with the output gear 25 rotates about the rotating shaft core X with respect to the outer case 11. As a result, the relative rotation phase between the driving-side rotating body A and the driven-side rotating body B is set, and the valve opening and closing timing is set by the intake camshaft 2.

Additionally, when the eccentric shaft core Y of the input gear 30 revolves about the rotating shaft core X, the input gear 30 is displaced, in response to which the coupling member 40 as the Oldham coupling Cx is displaced in the direction (first direction) in which the pair of external engaging arms 42 extend with respect to the outer case 11. The input gear 30 is displaced in the direction (second direction) in which the pair of internal engaging arms 43 extend.

As described above, the external teeth 30A of the input gear 30 have one tooth less than the internal teeth 25A of the output gear 25. Thus, when the eccentric shaft core Y of the input gear 30 revolves once about the rotating shaft core X, the output gear 25 rotates by one tooth, thereby resulting in a greater deceleration.

Figure 4:
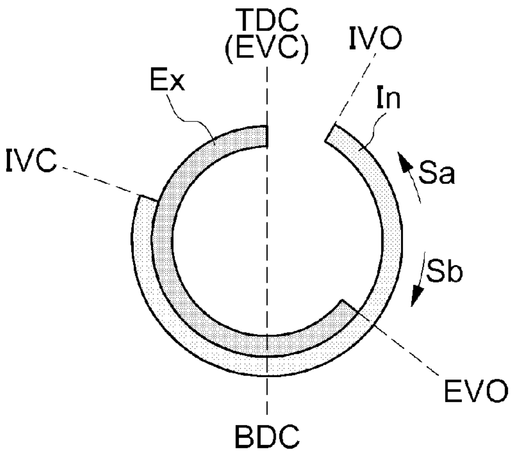
FIG. 4 is a diagram illustrating a valve opening and closing timing of an intake valve when an intake valve timing is set to a retard side.

The relative rotation phase between the outer case 11 and the intermediate member 20 is under control of the phase controller 9. FIG. 4 is a diagram illustrating an intake timing In of the intake valve Va under control of the valve opening and closing timing control device 100 at the intake side and an exhaust timing Ex of the exhaust valve Vb under control of the valve opening and closing timing control device 101 at the exhaust side. FIG. 4 is a diagram when the intake timing In of the intake valve Va is set to the retard side and the exhaust timing Ex of the exhaust valve Vb is set to normal.

Specifically, when the intake timing In of the intake valve Va is set to the retard side, the valve opening timing of the intake valve Va (hereinafter, referred to as an intake valve open (IVO)) is retarded from (in the retard direction Sb of) a top dead center (TDC), and the valve closing timing of the intake valve Va (hereinafter, referred to as an intake valve close (IVC)) is retarded from (in the retard direction Sb of) a bottom dead center (BDC). In other words, during a compression stroke in which the piston 4 moves from the BDC to the TDC, the intake valve Va shifts from an open state to a closed state.

When the exhaust timing Ex of the exhaust valve Vb is set to normal, the valve closing timing of the exhaust valve Vb (hereinafter, referred to as an exhaust valve close (EVC)) is aligned with the TDC, and the valve opening timing of the exhaust valve Vb (hereinafter, referred to as an exhaust valve open (EVO)) is advanced from (arranged in the advance direction Sa of) the BDC. In other words, during an exhaust stroke in which the piston 4 moves from the BDC to the TDC, the exhaust valve Vb is constantly maintained at an open state.

With the intake timing In of the intake valve Va being set to the retard side, when the exhaust valve Vb has shifted to a closed state at the EVC, causing the crankshaft 1 to rotate by a predetermined amount, the intake valve Va starts to shift to the open state at the IVO. Then, during the compression stroke in which the piston 4 moves from the BDC to the TDC, the intake valve Va shifts from the open state to the closed state.

With this configuration, before the piston 4 reaches the TDC, the gas is sealed in the combustion chamber, and in-cylinder pressure (pressure in the combustion chamber) is thus increased, leading to compression of the gas and an increase in temperature of the gas in combustion chamber.

Figure 5:
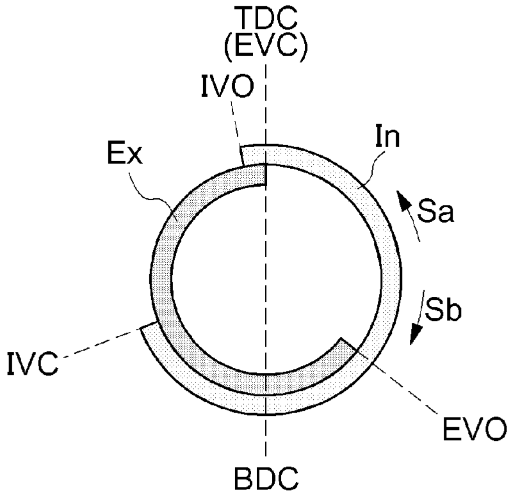
FIG. 5 is a diagram illustrating the valve opening and closing timing of the intake valve when the intake valve timing is set to an advance side.

On the other hand, when the rotational speed of the engine E is increased during the travel of the vehicle, the phase controller 9 increases an amount of intake air. In this case, the valve opening and closing timing control device 100 at the intake side is under control to rearrange the IVO to the advance side (in the advance direction Sa). FIG. 5 is a diagram when the intake timing In of the intake valve Va is set to the advance side and the exhaust timing Ex of the exhaust valve Vb is set to normal.

Specifically, when the intake timing In of the intake valve Va is set to the advance side, the IVO is advanced from (arranged in the advance direction Sa of) the TDC. In this state too, the IVC is retarded from (in the retard direction Sb of) the BDC. In other words, during the compression stroke in which the piston 4 moves from the BDC to the TDC, the intake valve Va shifts from the open state to the closed state.

Concurrently, when the exhaust timing Ex of the exhaust valve Vb is set to normal, the EVC is aligned with the TDC, and the EVO is advanced from (arranged in the advance direction Sa of) the BDC. In other words, during the exhaust stroke in which the piston 4 moves from the BDC to the TDC, the exhaust valve Vb is constantly maintained at the open state.

With the intake timing In of the intake valve Va being set to the advance side, when the intake valve Va has shifted to the open state at the IVO, causing the crankshaft 1 to rotate by the predetermined amount, the exhaust valve Vb starts to shift to the closed state at the EVC. As described above, with the intake timing In of the intake valve Va being set to the advance side, immediately before the exhaust valve Vb shifts to the closed state at the EVC, the intake valve Va starts to shift to the open state at the IVO, thereby forming an overlap range where the exhaust valve Vb and the intake valve Va are simultaneously open.

In this embodiment, upon receipt of a command to stop the engine E, the phase controller 9 performs retard operation control to shift the relative rotation phase to a most retarded phase by displacing the intermediate member 20 in the opposite direction to a rotating direction of the outer case 11; and when the rotational speed of the engine E reaches a lower limit rotational speed N2 predetermined during stopping of the engine E, the phase controller 9 performs advance operation control to advance the relative rotation phase as the most retarded phase by displacing the intermediate member 20 in the same direction as the rotating direction of the outer case 11.

The command to stop the engine E is transmitted from a host system of the phase controller 9. The command to stop the engine E corresponds to an intermittent stop command to temporarily stop the operation of the engine E during the travel of the vehicle. In this intermittent stop command, the engine E is stopped when, for example, the vehicle is at a speed equal to or lower than a first speed predetermined, and the engine E is stopped for a predetermined period of time (e.g., a typically called idling stop) when the vehicle is at a speed equal to or higher than a second speed predetermined. In these cases, the phase controller 9 performs the retard phase control to shift the relative rotation phase to the most retarded phase. In this embodiment, the most retarded phase corresponds to a most retarded closing timing where the IVC of the intake valve Va is arranged within a range defined by a first timing at which the IVC is off the TDC of the piston 4 of the engine E, the TDC as a reference point, to the advance side by a first crank angle predetermined, and a second timing at which the IVC is off the TDC to the retard side by a second crank angle predetermined. The second speed is lower than the first speed.

Figure 6:
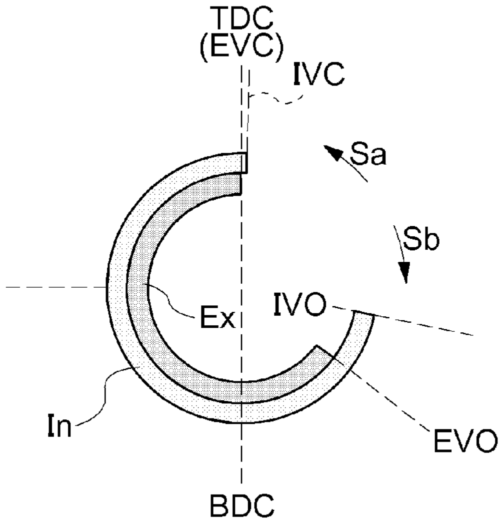
FIG. 6 is a diagram illustrating the valve opening and closing timing of the intake valve when the intake valve timing is set as a most retarded opening timing.

FIG. 6 is a diagram when the intake timing In of the intake valve Va is set to the most retarded closing timing and the exhaust timing of the exhaust valve Vb is set to normal. With the intake timing In of the intake valve Va being set to the most retarded closing timing, the IVC is arranged near the TDC, in other words, between the first timing at which the IVC is advanced from (arranged in the advance direction Sa of) the TDC by the first crank angle (e.g., by five crank angles), and the second timing at which the IVC is retarded from (in the retard direction Sb of) the TDC by the second crank angle (e.g. by five crank angles).

With the valve timing being set as above, the intake valve Va is displaced in the retard direction Sb such that the intake valve Va is closed (shifts to the IVC) around when the piston 4 reaches the TDC. Concurrently, the intake valve Va is open (shifts to the IVO) around when the piston 4 is located near the middle between the TDC and the BDC.

Specifically, as the most retarded closing timing, the timing at which the intake valve Va shifts to the closed state (IVC) is more retarded than the retarded closing timing illustrated in FIG. 4, and the IVO is arranged "before BDC (BBDC)" with respect to the BDC as a reference point. Thus, the IVC is arranged near the TDC.

When the exhaust valve Vb has shifted to the closed state at the EVC, causing the crankshaft 1 to rotate by the predetermined amount, the intake valve Va starts to shift to the open state at the IVO. During the compression stroke, the intake valve Va is maintained at the open state and then, around when the piston 4 reaches the TDC, the intake valve Va shifts to the closed state at the IVC.

With this configuration, the air supplied to the combustion chamber through the intake valve Va until the piston 4 reaches the BDC from the TDC is to be almost entirely returned to the intake manifold 111 from the combustion chamber through the intake valve Va before the piston 4 reaches the TDC from the BDC. As a result, in the exhaust stroke, an oxygen-containing air discharged from the combustion chamber to the exhaust manifold 112 through the exhaust valve Vb is kept to minimum, and the catalyst 113 is thus less prone to deteriorate.

As described above, upon receipt of the command to stop the engine E, the phase controller 9 performs the retard operation control to shift the relative rotation phase between the intermediate member 20 and the outer case 11 to the most retarded phase. Further, when the rotational speed of the engine E reaches the lower limit rotational speed N2 predetermined during the stopping of the engine E, the phase controller 9 performs the advance operation control to advance the relative rotation phase as the most retarded phase by displacing the intermediate member 20 in the same direction as the rotating direction of the outer case 11.

Figure 7:
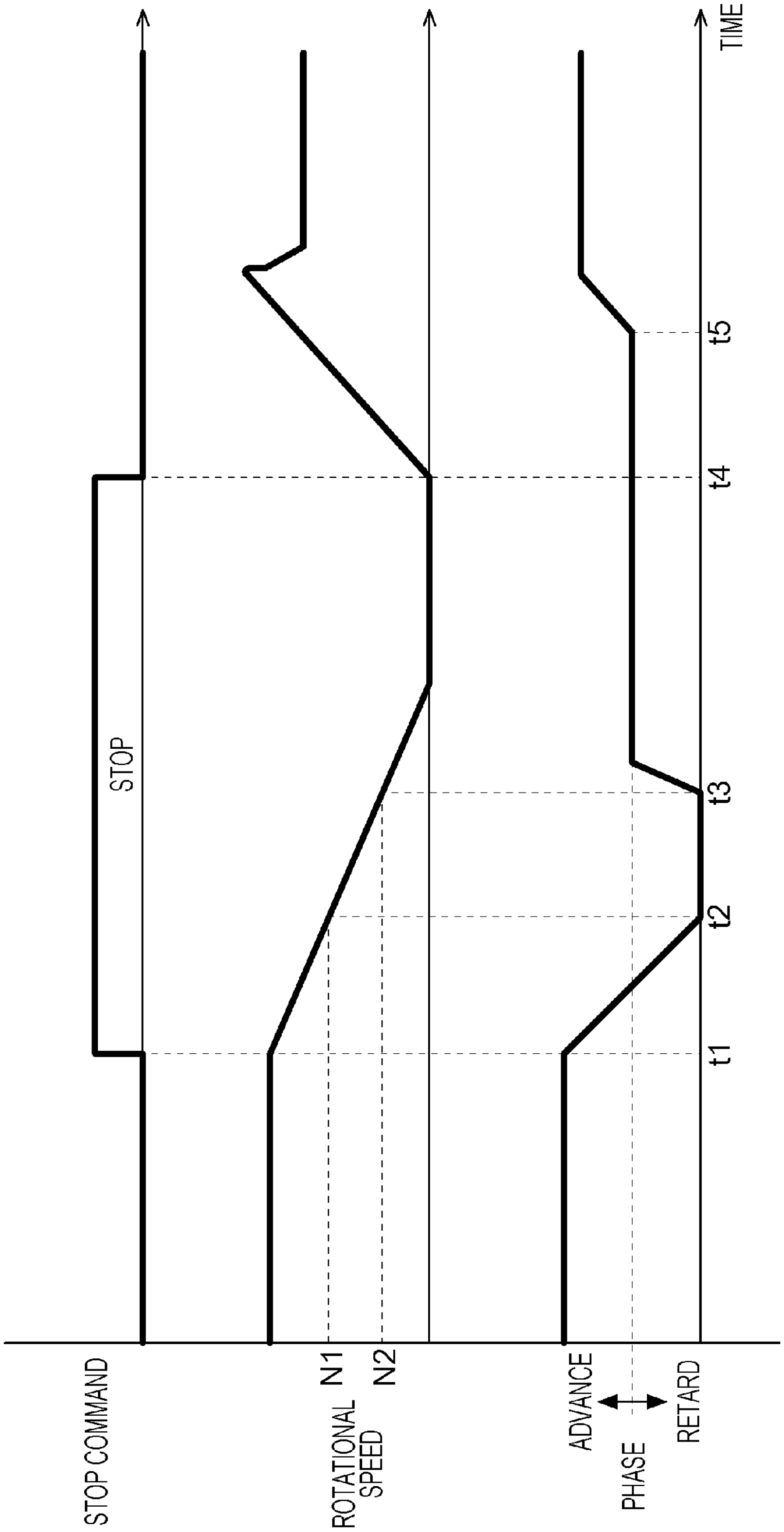
FIG. 7 is a diagram showing a relative rotation phase under control of a phase controller.

FIG. 7 shows a timing chart. Here, before reaching t1, the engine E runs at the rotational speed predetermined, with the relative rotation phase being at the advance side. In this state, the command to stop the engine E is presumably transmitted (t1). Then, the vehicle decelerates and when the rotational speed of the engine E reaches N1, the phase controller 9 shifts the relative rotation phase to the most retarded rotation phase that corresponds to the most retarded closing timing of the intake valve Va (t2).

The rotational speed of the engine E is reduced in response to the command to stop the engine E. In this state, when the rotational speed of the engine E reaches the lower limit rotational speed N2, the phase controller 9 advances the relative rotation phase from the most retarded phase corresponding to the most retarded closing timing (shifts the relative rotation phase in the advance direction Sa from the most retarded phase) (t3). In this advance operation control, the relative rotation phase is not shifted to the advance side but is at least advanced from the most retarded phase. Specifically, the phase controller 9 controls the relative rotation phase to be suitable for next start of the engine E. A relative rotation phase of this type may correspond to, for example, the relative rotation phase illustrated in FIG. 4.

Accordingly, it is possible to appropriately start the engine E upon receipt of a command to start the engine E (t4). When the engine E has started, the phase controller 9 may preferably shift the relative rotation phase in accordance with a traveling state of the vehicle (in an example of FIG. 7, the phase controller 9 performs the advance operation control at t5). The phase controller may also perform the retard operation control in accordance with the traveling state of the vehicle.

Here, the phase controller 9 may be configured, during the stopping of the engine E, to switch between an eco mode not to perform the advance operation control and a torque mode to perform the advance operation control. The eco mode not to perform the advance operation control during the stopping of the engine E is a low fuel consumption travel mode where a reduction in amount of fuel used in the engine E is prioritized over a response (drivability) of the vehicle. Switching between the eco mode and the torque mode may be executed by a user operating a touch panel or a button, or may be automatically executed based on a travel scene of the vehicle. When the mode switching is automatically executed based on the travel scene of the vehicle, the vehicle presumably is in the torque mode while, for example, traveling on a highway, and is in the eco mode while traveling on a general road.

In the case above, even when, in response to the command to stop the engine E, the rotational speed of the engine E is reduced until reaching the lower limit rotational speed N2, the phase controller 9 does not advance the relative rotation phase from the most retarded phase as the most retarded closing timing (does not shift the relative rotation phase in the advance direction Sa from the most retarded phase). Thus, on receipt of the command to start the engine E next, the phase controller 9 is to perform the advance operation control. This may deteriorate the response until the vehicle starts to travel, but blocks the supply of fresh air to the catalyst. Accordingly, the catalyst is less prone to deteriorate while enabling the low fuel consumption travel.

On the other hand, in the torque mode to perform the advance operation control during the stopping of the engine E, the response (drivability) of the vehicle is prioritized over the reduction in amount of fuel used in the vehicle. In this case, as described above, when the rotational speed of the engine E reaches the lower limit rotational speed N2, the phase controller 9 may preferably advance the relative rotation phase from the most retarded phase as the most retarded closing timing (shift the relative rotation phase in the advance direction Sa from the most retarded phase).

The phase controller 9 may be configured to perform the advance operation control not only when the rotational speed of the engine E is equal to or lower than the lower limit rotational speed N2, but also upon receipt of a request to open a throttle and when the rotational speed of the engine E is equal to or lower than the lower limit rotational speed N2. The request to open the throttle is a command for the driver to operate the accelerator pedal (or an accelerator lever) to open the throttle (not illustrated) of the engine E. The request is detected by the accelerator pedal sensor 147, which makes clear that the driver has an intention of starting the engine E. Accordingly, when the request to open the throttle has been detected by the accelerator pedal sensor 147 and when the rotational speed of the engine E has been equal to or lower than the lower limit rotational speed N2, the phase controller 9 may perform the advance operation control.

Other Embodiments

In the foregoing embodiment, the most retarded phase corresponds to the most retarded closing timing where the IVC of the intake valve Va is arranged within the range defined by the first timing at which the IVC is off the TDC of the piston 4 of the engine E, the TDC as the reference point, to the advance side by the first crank angle predetermined, and the second timing at which the IVC is off the TDC to the retard side by the second crank angle predetermined. The most retarded phase may not correspond to the most retarded closing timing, but may be a retarded phase advanced from the most retarded closing timing. The most retarded closing timing may be arranged within a range defined by the TDC of the piston 4 and the first timing at which the IVC is off the TDC to the advance side by the first crank angle predetermined, or may be arranged within a range defined by the TDC of the piston 4 and the second timing at which the IVC is off the TDC to the retard side by the second crank angle predetermined. The first crank angle and the second crank angle may be equal to each other, the first crank angle may be greater than the second crank angle, or the second crank angle may be greater than the first crank angle.

In the foregoing embodiment, the command to stop the engine E corresponds to the intermittent stop command to temporarily stop the operation of the engine E during the travel of the vehicle. Alternatively, the command to stop the engine E may not be the intermittent stop command to temporarily stop the vehicle, but may be a command to park the vehicle. The command to stop the engine E may be an idling stop command to temporarily stop the engine E of the vehicle while waiting for a traffic light.

In the foregoing embodiment, the phase controller 9 is configured, during the stopping of the engine E, to switch between the eco mode not to perform the advance operation control and the torque mode to perform the advance operation control. Alternatively, the phase controller 9 may be configured, during the stopping of the engine E, not to switch to the eco mode in which the advance operation control is not performed.

In the foregoing embodiment, upon receipt of the request to open the throttle and when the rotational speed of the engine E is equal to or lower than the lower limit rotational speed, the phase controller 9 performs the advance operation control. Alternatively, even when the rotational speed of the engine E is higher than the lower limit rotational speed, upon receipt of the request to open the throttle, the phase controller 9 may perform the advance operation control.

This disclosure is applicable to a valve opening and closing range control device.

A valve opening and closing timing control device includes: a driving-side rotating body configured to rotate about a rotating shaft core synchronously with a crankshaft of an internal combustion engine; a driven-side rotating body located inside the driving-side rotating body and coaxially with the rotating shaft core, and configured to rotate integrally with a camshaft for opening and closing an intake valve of the internal combustion engine; a phase adjusting mechanism configured to set a relative rotation phase between the driving-side rotating body and the driven-side rotating body by a driving force of an electric motor; and a phase controller configured, upon receipt of a command to stop the internal combustion engine, to perform retard operation control to shift the relative rotation phase to a most retarded phase by displacing the driven-side rotating body in a direction opposite to a rotating direction of the driving-side rotating body, and configured, when rotational speed of the internal combustion engine reaches a lower limit rotational speed predetermined during stopping of the internal combustion engine, to perform advance operation control to advance the relative rotation phase as the most retarded phase by displacing the driven-side rotating body in a direction same as the rotating direction of the driving-side rotating body.

With this configuration, for example, when the retard operation control is performed in response to the command to stop the internal combustion engine, in a case of the user's "change of mind", the internal combustion engine needs to restart. Examples of the user's change of mind include a case where the user changes his or her mind to overtake a preceding vehicle with his or her foot off from the accelerator. With the configuration described above, when the rotational speed of the internal combustion engine has reached the lower limit rotational speed predetermined during the stopping of the internal combustion engine, the valve opening and closing timing control device performs the advance operation control to advance the relative rotation phase between the driving-side rotating body and the driven-side rotating body so as to be prepared for restart of the internal combustion engine. Thus, the response delay (delay in response to the request to restart the internal combustion engine) is less prone to occur.

Further, in the valve opening and closing timing control device, the most retarded phase preferably corresponds to the most retarded closing timing where the closing of the intake valve is arranged within the range defined by the first timing at which the closing timing is off a top dead center of the piston of the internal combustion engine, the top dead center as the reference point, to the advance side by the first crank angle predetermined, and the second timing at which the closing timing is off the top dead center to the retard side by the second crank angle predetermined.

With this configuration, when the supply of fuel is stopped in response to the command to stop the internal combustion engine, the valve opening and closing timing control device performs the retard operation control to shift the relative rotation phase between the driving-side rotating body and the driven-side rotating body to the most retarded phase corresponding to the most retarded closing timing of the intake valve, so as to block the supply of fresh air to the catalyst in the exhaust flow path of the internal combustion engine. Accordingly, the catalyst is less prone to deteriorate.

In the valve opening and closing timing control device, the command to stop the internal combustion engine corresponds to the intermittent stop command to temporarily stop the operation of the internal combustion engine during the travel of a vehicle.

With this configuration, the valve opening and closing timing control device is applicable to a hybrid vehicle having a typically called intermittent idling stop function to repeatedly operate and stop the internal combustion engine while traveling in response to, for example, the speed of the vehicle or an output torque required of the internal combustion engine. Then, as described above, the delay in response to the command to restart the internal combustion engine is less prone to occur.

In the valve opening and closing timing control device, during the stopping of the internal combustion engine, the phase controller preferably switches between the eco mode not to perform the advance operation control and the torque mode to perform the advance operation control.

With this configuration, in the eco mode, the reduction in fuel consumption is prioritized over the delay in response to the command to restart the internal combustion engine, and in the torque mode, the reduction in delay in response to the command to restart the internal combustion engine is prioritized over the reduction in fuel consumption. Accordingly, the driving condition is provided to meet the users' request.

In the valve opening and closing timing control device, the phase controller preferably performs the advance operation control upon receipt of the request to open the throttle and when the rotational speed of the internal combustion engine is equal to or lower than the lower limit rotational speed.

With this configuration, upon receipt of the command to stop the internal combustion engine in addition to the request to open the throttle, it is highly likely that the internal combustion engine needs to restart. Thus, this configuration facilitates smooth restart of the internal combustion engine.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A valve opening and closing timing control device comprising:

a driving-side rotating body configured to rotate about a rotating shaft core synchronously with a crankshaft of an internal combustion engine;

a driven-side rotating body located inside the driving-side rotating body and coaxially with the rotating shaft core, and configured to rotate integrally with a camshaft for opening and closing an intake valve of the internal combustion engine;

a phase adjusting mechanism configured to set a relative rotation phase between the driving-side rotating body and the driven-side rotating body by a driving force of an electric motor; and a phase controller configured, upon receipt of a command to stop the internal combustion engine, to perform retard operation control to shift the relative rotation phase to a most retarded phase by displacing the driven-side rotating body in a direction opposite to a rotating direction of the driving-side rotating body, and configured, when rotational speed of the internal combustion engine reaches a lower limit rotational speed predetermined during stopping of the internal combustion engine, to perform advance operation control to advance the relative rotation phase as the most retarded phase by displacing the driven-side rotating body in a direction same as the rotating direction of the driving-side rotating body.

2. The valve opening and closing timing control device according to claim 1, wherein the most retarded phase corresponds to a most retarded closing timing of the intake valve being arranged within a range defined by a first timing at which timing for closing the intake valve is off a top dead center of a piston of the internal combustion engine, the top dead center as a reference point, to an advance side by a first crank angle predetermined, and a second timing at which the timing is off the top dead center to a retard side by a second crank angle predetermined.

3. The valve opening and closing timing control device according to claim 1, wherein the command to stop the internal combustion engine corresponds to an intermittent stop command to temporarily stop an operation of the internal combustion engine during travel of a vehicle.

4. The valve opening and closing timing control device according to claim 2, wherein the command to stop the internal combustion engine corresponds to an intermittent stop command to temporarily stop an operation of the internal combustion engine during travel of a vehicle.

5. The valve opening and closing timing control device according to claim 1, wherein the phase controller is configured, during the stopping of the internal combustion engine, to switch between an eco mode not to perform the advance operation control and a torque mode to perform the advance operation control.

6. The valve opening and closing timing control device according to claim 2, wherein the phase controller is configured, during the stopping of the internal combustion engine, to switch between an eco mode not to perform the advance operation control and a torque mode to perform the advance operation control.

7. The valve opening and closing timing control device according to claim 1, wherein upon receipt of a request to open a throttle and when the rotational speed of the internal combustion engine is equal to or lower than the lower limit rotational speed, the phase controller performs the advance operation control.

8. The valve opening and closing timing control device according to claim 2, wherein upon receipt of a request to open a throttle and when the rotational speed of the internal combustion engine is equal to or lower than the lower limit rotational speed, the phase controller performs the advance operation control.

* * * * *